United States Patent [19]
Tyler

[11] Patent Number: 5,195,716
[45] Date of Patent: Mar. 23, 1993

[54] HIGH STABILITY ASEISMIC BEARING

[75] Inventor: Ray G. Tyler, Lower Hutt, New Zealand

[73] Assignee: Skellerup Rubber Manufacturing Limited, New Zealand

[21] Appl. No.: 388,077

[22] Filed: Aug. 1, 1989

[30] Foreign Application Priority Data

Aug. 2, 1988 [NZ] New Zealand .................. 225652

[51] Int. Cl.$^5$ ............................................. E04H 9/02
[52] U.S. Cl. .................................. 248/632; 248/638; 52/167
[58] Field of Search .............. 298/632, 633, 634, 638; 188/268; 267/141, 141.1; 52/167

[56] References Cited

U.S. PATENT DOCUMENTS

| | | | |
|---|---|---|---|
| 2,346,271 | 4/1944 | Page | 248/632 |
| 2,661,943 | 12/1953 | Wilbur | 248/632 |
| 2,982,536 | 5/1961 | Kordes | 267/153 |
| 3,105,252 | 10/1963 | Milk | 52/167 |
| 4,121,393 | 10/1978 | Renault | 52/167 |
| 4,402,483 | 9/1983 | Kurabayashi | 248/638 |
| 4,499,694 | 2/1985 | Buckle | 52/167 |
| 4,599,834 | 7/1986 | Fujimoto | 52/167 |

FOREIGN PATENT DOCUMENTS

| | | | |
|---|---|---|---|
| 8403717 | 7/1986 | Netherlands | 267/153 |
| 696115 | 11/1979 | U.S.S.R. | 52/167 |

OTHER PUBLICATIONS

Kelly, J. M., Hodder, S. B., Earthquake Engineering Research Center, "Experimental Study of Lead and Elastomeric Dampers for Base Isolation Systems", Oct. 1981.

Primary Examiner—Ramon O. Ramirez
Assistant Examiner—Robert A. Olson
Attorney, Agent, or Firm—Leydig, Voit & Mayer

[57] ABSTRACT

A high stability bearing includes two or more plates each of which has three or more disc shaped bearings mounted on or formed integrally with a surface or surfaces thereof, the disc shaped bearings and adjacent plates being joined together to form a bearing assembly with, the disc shaped bearings being linked or stiffened by the plates to form a stable unit. The disc shaped bearings are preferably constructed from a synthetic or natural rubber material having a shore hardness in the range of about 30 to 80. Each plate or an assembled set of plates can have a skirt which protects the interior of the assembly against the ingress of deleterious matter to the space or spaces between adjacent plates. The assembly can also include the provision of damping within the bearing by incorporating an energy absorbing component or components within or between the layers of the bearing.

4 Claims, 31 Drawing Sheets

TABLE 1.    FIGURE 4

| FIG. | Load kg | Disk thickness mm | Disk diameter mm | max. period* sec | no. layers* |
|---|---|---|---|---|---|
| 5 | 1000 | 10 | 80 | 1.05 | 17 |
| 6 |  | 11 | 70 | 1.00 | 16 |
| 7 | 2000 | 8 | 80 | 1.48 | 21 |
| 8 |  | 10 | 80 | 1.02 | 17 |
| 9 | 5000 | 10 | 110 | 1.72 | 17 |
| 10 |  | 10 | 100 | 1.54 | 17 |
| 11 | 10000 | 10 | 130 | 2.05 | 17 |
| 12 |  | 10 | 110 | 1.66 | 17 |
| 13 | 15000 | 10 | 130 | 2.05 | 17 |
| 14 |  | 10 | 130 | 1.72 | 17 |
| 15 | 20000 | 10 | 150 | 2.05 | 17 |
| 16 |  | 10 | 140 | 1.85 | 17 |
| 18 | 50000 | 10 | 180 | 2.27 | 17 |
| 19 | 100000 | 10 | 200 | 2.24 | 17 |

*this is for a height of approximately 240 mm

| | | |
|---|---|---|
| Disk thickness | 10 mm | |
| Disk diameter | 80 mm | |
| Disks/layer | 4 | |
| Thickness of: | | FIGURE 5 (PART 1) |
| inner plates | 3 mm | |
| outer plates | 5 mm | |
| Area/disk | 5027 mm2 | |
| Perimeter/disk | 251 mm | |
| Shape Factor/disk | 2.00 | |
| Comp. modulus | 7.76 N/mm2 | |
| Comp. stiffness/disk | 3.89 kN/mm | |
| Shear stiffness/disk | 0.151 kN/mm | |
| Comp. strain @ zero shear | 0.100 | |
| Rated load @ zero shear | 15.6 kN | |
| equivalent to | 1585 kg | |

Actual load                 1000 kg    =    63% of rated load

| no. layers | Heights rubber mm | total mm | Comp. stiff kN/mm | Shear stiff kN/mm | Period Horiz sec | Vert sec |
|---|---|---|---|---|---|---|
| 1 | 10 | 20 | 15.6 | 0.60 | 0.26 | 0.05 |
| 5 | 50 | 72 | 3.1 | 0.12 | 0.57 | 0.11 |
| 10 | 100 | 137 | 1.6 | 0.06 | 0.81 | 0.16 |
| 11 | 110 | 150 | 1.4 | 0.05 | 0.85 | 0.17 |
| 12 | 120 | 163 | 1.3 | 0.05 | 0.89 | 0.17 |
| 13 | 130 | 176 | 1.2 | 0.05 | 0.92 | 0.18 |
| 14 | 140 | 189 | 1.1 | 0.04 | 0.96 | 0.19 |
| 15 | 150 | 202 | 1.0 | 0.04 | 0.99 | 0.20 |
| 16 | 160 | 215 | 1.0 | 0.04 | 1.02 | 0.20 |
| 17 | 170 | 228 | 0.9 | 0.04 | 1.05 | 0.21 |
| 18 | 180 | 241 | 0.9 | 0.03 | 1.09 | 0.21 |

| | | | | | | |
|---|---|---|---|---|---|---|
| 19 | 190 | 254 | 0.8 | 0.03 | 1.12 | 0.22 |
| 20 | 200 | 267 | 0.8 | 0.03 | 1.14 | 0.23 |
| 21 | 210 | 280 | 0.7 | 0.03 | 1.17 | 0.23 |
| 22 | 220 | 293 | 0.7 | 0.03 | 1.20 | 0.24 |
| 23 | 230 | 306 | 0.7 | 0.03 | 1.23 | 0.24 |
| 24 | 240 | 319 | 0.6 | 0.03 | 1.25 | 0.25 |
| 25 | 250 | 332 | 0.6 | 0.02 | 1.28 | 0.25 |
| 26 | 260 | 345 | 0.6 | 0.02 | 1.30 | 0.26 |
| 27 | 270 | 358 | 0.6 | 0.02 | 1.33 | 0.26 |
| 28 | 280 | 371 | 0.6 | 0.02 | 1.35 | 0.27 |
| 29 | 290 | 384 | 0.5 | 0.02 | 1.38 | 0.27 |
| 30 | 300 | 397 | 0.5 | <0.02 | 1.40 | 0.28 |
| 31 | 310 | 410 | 0.5 | 0.02 | 1.42 | 0.28 |
| 32 | 320 | 423 | 0.5 | 0.02 | 1.45 | 0.29 |
| 33 | 330 | 436 | 0.5 | 0.02 | 1.47 | 0.29 |
| 34 | 340 | 449 | 0.5 | 0.02 | 1.49 | 0.29 |
| 35 | 350 | 462 | 0.4 | 0.02 | 1.51 | 0.30 |
| 36 | 360 | 475 | 0.4 | 0.02 | 1.53 | 0.30 |

FIGURE 5 (PART 2)

| | | |
|---|---|---|
| Disk thickness | 11 mm | |
| Disk diameter | 70 mm | |
| Disks/layer | 4 | |
| Thickness of: | | FIGURE 6 (PART 1) |
| inner plates | 3 mm | |
| outer plates | 5 mm | |
| Area/disk | 3848 mm2 | |
| Perimeter/disk | 220 mm | |
| Shape Factor/disk | 1.59 | |
| Comp. modulus | 7.95 N/mm2 | |
| Comp. stiffness/disk | 2.77 kN/mm | |
| Shear stiffness/disk | 0.157 kN/mm | |
| Comp. strain @ zero shear | 0.100 | |
| Rated load @ zero shear | 12.2 kN | |
| equivalent to | 1243 kg | |
| Actual load | 1000 kg = | 80% of rated load |

| no. layers | Heights | | Comp. stiff | Shear stiff | Period | |
|---|---|---|---|---|---|---|
| | rubber mm | total mm | kN/mm | kN/mm | Horiz sec | Vert sec |
| 1 | 11 | 21 | 11.1 | 0.63 | 0.26 | 0.06 |
| 5 | 55 | 77 | 2.2 | 0.13 | 0.56 | 0.13 |
| 10 | 110 | 147 | 1.1 | 0.06 | 0.79 | 0.19 |
| 11 | 121 | 161 | 1.0 | 0.06 | 0.83 | 0.20 |
| 12 | 132 | 175 | 0.9 | 0.05 | 0.87 | 0.21 |
| 13 | 143 | 189 | 0.9 | 0.05 | 0.90 | 0.22 |
| 14 | 154 | 203 | 0.8 | 0.04 | 0.94 | 0.22 |
| 15 | 165 | 217 | 0.7 | 0.04 | 0.97 | 0.23 |
| 16 | 176 | 231 | 0.7 | 0.04 | 1.00 | 0.24 |
| 17 | 187 | 245 | 0.7 | 0.04 | 1.03 | 0.25 |
| 18 | 198 | 259 | 0.6 | 0.03 | 1.06 | 0.25 |

| | | | | | | |
|---|---|---|---|---|---|---|
| 19 | 209 | 273 | 0.6 | 0.03 | 1.09 | 0.26 |
| 20 | 220 | 287 | 0.6 | 0.03 | 1.12 | 0.27 |
| 21 | 231 | 301 | 0.5 | 0.03 | 1.15 | 0.27 |
| 22 | 242 | 315 | 0.5 | 0.03 | 1.17 | 0.28 |
| 23 | 253 | 329 | 0.5 | 0.03 | 1.20 | 0.29 |
| 24 | 264 | 343 | 0.5 | 0.03 | 1.23 | 0.29 |
| 25 | 275 | 357 | 0.4 | 0.03 | 1.25 | 0.30 |
| 26 | 286 | 371 | 0.4 | 0.02 | 1.28 | 0.30 |
| 27 | 297 | 385 | 0.4 | 0.02 | 1.30 | 0.31 |
| 28 | 308 | 399 | 0.4 | 0.02 | 1.32 | 0.32 |
| 29 | 319 | 413 | 0.4 | 0.02 | 1.35 | 0.32 |
| 30 | 330 | 427 | 0.4 | 0.02 | 1.37 | 0.33 |
| 31 | 341 | 441 | 0.4 | 0.02 | 1.39 | 0.33 |
| 32 | 352 | 455 | 0.3 | 0.02 | 1.42 | 0.34 |
| 33 | 363 | 469 | 0.3 | 0.02 | 1.44 | 0.34 |
| 34 | 374 | 483 | 0.3 | 0.02 | 1.46 | 0.35 |
| 35 | 385 | 497 | 0.3 | 0.02 | 1.48 | 0.35 |
| 36 | 396 | 511 | 0.3 | 0.02 | 1.50 | 0.36 |

FIGURE 6 (PART 2)

| | | FIGURE 7 (PART 1) |
|---|---|---|
| Disk thickness | 8 mm | |
| Disk diameter | 80 mm | |
| Disks/layer | 4 | |
| Thickness of: | | |
| inner plates | 3 mm | |
| outer plates | 5 mm | |
| Area/disk | 5027 mm2 | |
| Perimeter/disk | 251 mm | |
| Shape Factor/disk | 2.50 | |
| Comp. modulus | 11.62 N/mm2 | |
| Comp. stiffness/disk | 7.26 kN/mm | |
| Shear stiffness/disk | 0.188 kN/mm | |
| Comp. strain @ zero shear | 0.100 | |
| Rated load @ zero shear | 23.2 kN | |
| equivalent to | 2367 kg | |
| Actual load | 2000 kg = | 85% of rated load |

| no. layers | Heights rubber mm | total mm | Comp. stiff kN/mm | Shear stiff. kN/mm | Period Horiz sec | Vert sec |
|---|---|---|---|---|---|---|
| 1 | 8 | 18 | 29.0 | 0.75 | 0.32 | 0.05 |
| 5 | 40 | 62 | 5.8 | 0.15 | 0.72 | 0.12 |
| 6 | 48 | 73 | 4.8 | 0.13 | 0.79 | 0.13 |
| 10 | 80 | 117 | 2.9 | 0.08 | 1.02 | 0.16 |
| 11 | 88 | 128 | 2.6 | 0.07 | 1.07 | 0.17 |
| 12 | 96 | 139 | 2.4 | 0.06 | 1.12 | 0.18 |
| 13 | 104 | 150 | 2.2 | 0.06 | 1.17 | 0.19 |
| 14 | 112 | 161 | 2.1 | 0.05 | 1.21 | 0.20 |
| 15 | 120 | 172 | 1.9 | 0.05 | 1.25 | 0.20 |
| 16 | 128 | 183 | 1.8 | 0.05 | 1.29 | 0.21 |
| 17 | 136 | 194 | 1.7 | 0.04 | 1.33 | 0.22 |

| | | | | | | |
|---|---|---|---|---|---|---|
| 18 | 144 | 205 | 1.6 | 0.04 | 1.37 | 0.22 |
| 19 | 152 | 216 | 1.5 | 0.04 | 1.41 | 0.23 |
| 20 | 160 | 227 | 1.5 | 0.04 | 1.45 | 0.23 |
| 21 | 168 | 238 | 1.4 | 0.04 | 1.48 | 0.24 |
| 22 | 176 | 249 | 1.3 | 0.03 | 1.52 | 0.24 |
| 23 | 184 | 260 | 1.3 | 0.03 | 1.55 | 0.25 |
| 24 | 192 | 271 | 1.2 | 0.03 | 1.59 | 0.26 |
| 25 | 200 | 282 | 1.2 | 0.03 | 1.62 | 0.26 |
| 26 | 208 | 293 | 1.1 | 0.03 | 1.65 | 0.27 |
| 27 | 216 | 304 | 1.1 | 0.03 | 1.68 | 0.27 |
| 28 | 224 | 315 | 1.0 | 0.03 | 1.71 | 0.28 |
| 29 | 232 | 326 | 1.0 | 0.03 | 1.74 | 0.28 |
| 30 | 240 | 337 | 1.0 | 0.03 | 1.77 | 0.29 |
| 31 | 248 | 348 | 0.9 | 0.02 | 1.80 | 0.29 |
| 32 | 256 | 359 | 0.9 | 0.02 | 1.83 | 0.30 |
| 33 | 264 | 370 | 0.9 | 0.02 | 1.86 | 0.30 |
| 34 | 272 | 381 | 0.9 | 0.02 | 1.89 | 0.30 |
| 35 | 280 | 392 | 0.8 | 0.02 | 1.91 | 0.31 |

FIGURE 7 (PART 2)

| | | |
|---|---|---|
| Disk thickness | 10 mm | |
| Disk diameter | 80 mm | |
| Disks/layer | 4 | |
| Thickness of: | | FIGURE 8 (PART 1) |
|    inner plates | 3 mm | |
|    outer plates | 5 mm | |
| Area/disk | 5027 mm2 | |
| Perimeter/disk | 251 mm | |
| Shape Factor/disk | 2.00 | |
| Comp. modulus | 15.05 N/mm2 | |
| Comp. stiffness/disk | 7.51 kN/mm | |
| Shear stiffness/disk | 0.322 kN/mm | |
| Comp. strain @ zero shear | 0.100 | |
| Rated load @ zero shear | 30.0 kN | |
|    equivalent to | 3061 kg | |
| Actual load | 2000 kg = | 65% of rated load |

| no. layers | Heights rubber mm | total mm | Comp. stiff kN/mm | Shear stiff kN/mm | Period Horiz sec | Vert sec |
|---|---|---|---|---|---|---|
| 1 | 10 | 20 | 30.0 | 1.29 | 0.25 | 0.05 |
| 5 | 50 | 72 | 6.0 | 0.26 | 0.55 | 0.11 |
| 10 | 100 | 137 | 3.0 | 0.13 | 0.78 | 0.16 |
| 11 | 110 | 150 | 2.7 | 0.12 | 0.82 | 0.17 |
| 12 | 120 | 163 | 2.5 | 0.11 | 0.86 | 0.18 |
| 13 | 130 | 176 | 2.3 | 0.10 | 0.89 | 0.18 |
| 14 | 140 | 189 | 2.1 | 0.09 | 0.93 | 0.19 |
| 15 | 150 | 202 | 2.0 | 0.09 | 0.96 | 0.20 |
| 16 | 160 | 215 | 1.9 | 0.08 | 0.99 | 0.21 |
| 17 | 170 | 228 | 1.8 | 0.08 | 1.02 | 0.21 |
| 18 | 180 | 241 | 1.7 | 0.07 | 1.05 | 0.22 |

| | | | | | | |
|---|---|---|---|---|---|---|
| 19 | 190 | 254 | 1.6 | 0.07 | 1.08 | 0.22 |
| 20 | 200 | 267 | 1.5 | 0.06 | 1.11 | 0.23 |
| 21 | 210 | 280 | 1.4 | 0.06 | 1.14 | 0.23 |
| 22 | 220 | 293 | 1.4 | 0.06 | 1.16 | 0.24 |
| 23 | 230 | 306 | 1.3 | 0.06 | 1.19 | 0.25 |
| 24 | 240 | 319 | 1.3 | 0.05 | 1.21 | 0.25 |
| 25 | 250 | 332 | 1.2 | 0.05 | 1.24 | 0.26 |
| 26 | 260 | 345 | 1.2 | 0.05 | 1.26 | 0.26 |
| 27 | 270 | 358 | 1.1 | 0.05 | 1.29 | 0.27 |
| 28 | 280 | 371 | 1.1 | 0.05 | 1.31 | 0.27 |
| 29 | 290 | 384 | 1.0 | 0.04 | 1.33 | 0.28 |
| 30 | 300 | 397 | 1.0 | 0.04 | 1.36 | 0.28 |
| 31 | 310 | 410 | 1.0 | 0.04 | 1.38 | 0.29 |
| 32 | 320 | 423 | 0.9 | 0.04 | 1.40 | 0.29 |
| 33 | 330 | 436 | 0.9 | 0.04 | 1.42 | 0.29 |
| 34 | 340 | 449 | 0.9 | 0.04 | 1.44 | 0.30 |
| 35 | 350 | 462 | 0.9 | 0.04 | 1.47 | 0.30 |
| 36 | 360 | 475 | 0.8 | 0.04 | 1.49 | 0.31 |

FIGURE 8 (PART 2)

| | | |
|---|---|---|
| Disk thickness | 10 mm | |
| Disk diameter | 110 mm | |
| Disks/layer | 4 | |
| Thickness of: | | FIGURE 9 (PART 1) |
| inner plates | 3 mm | |
| outer plates | 5 mm | |
| Area/disk | 9503 mm2 | |
| Perimeter/disk | 346 mm | |
| Shape Factor/disk | 2.75 | |
| Comp. modulus | 13.86 N/mm2 | |
| Comp. stiffness/disk | 13.08 kN/mm | |
| Shear stiffness/disk | 0.285 kN/mm | |
| Comp. strain @ zero shear | 0.100 | |
| Rated load @ zero shear | 52.3 kN | |
| equivalent to | 5334 kg | |
| Actual load | 5000 kg = | 94% of rated load |

| no. layers | Heights rubber mm | total mm | Comp. stiff kN/mm | Shear stiff kN/mm | Period Horiz sec | Vert sec |
|---|---|---|---|---|---|---|
| 1 | 10 | 20 | 52.3 | 1.14 | 0.42 | 0.06 |
| 5 | 50 | 72 | 10.5 | 0.23 | 0.93 | 0.14 |
| 6 | 60 | 85 | 8.7 | 0.19 | 1.02 | 0.15 |
| 10 | 100 | 137 | 5.2 | 0.11 | 1.32 | 0.19 |
| 11 | 110 | 150 | 4.8 | 0.10 | 1.38 | 0.20 |
| 12 | 120 | 163 | 4.4 | 0.10 | 1.44 | 0.21 |
| 13 | 130 | 176 | 4.0 | 0.09 | 1.50 | 0.22 |
| 14 | 140 | 189 | 3.7 | 0.08 | 1.56 | 0.23 |
| 15 | 150 | 202 | 3.5 | 0.08 | 1.61 | 0.24 |
| 16 | 160 | 215 | 3.3 | 0.07 | 1.66 | 0.25 |
| 17 | 170 | 228 | 3.1 | 0.07 | 1.72 | 0.25 |

| | | | | | | |
|---|---|---|---|---|---|---|
| 18 | 180 | 241 | 2.9 | 0.06 | 1.77 | 0.26 |
| 19 | 190 | 254 | 2.8 | 0.06 | 1.81 | 0.27 |
| 20 | 200 | 267 | 2.6 | 0.06 | 1.86 | 0.27 |
| 21 | 210 | 280 | 2.5 | 0.05 | 1.91 | 0.28 |
| 22 | 220 | 293 | 2.4 | 0.05 | 1.95 | 0.29 |
| 23 | 230 | 306 | 2.3 | 0.05 | 2.00 | 0.29 |
| 24 | 240 | 319 | 2.2 | 0.05 | 2.04 | 0.30 |
| 25 | 250 | 332 | 2.1 | 0.05 | 2.08 | 0.31 |
| 26 | 260 | 345 | 2.0 | 0.04 | 2.12 | 0.31 |
| 27 | 270 | 358 | 1.9 | 0.04 | 2.16 | 0.32 |
| 28 | 280 | 371 | 1.9 | 0.04 | 2.20 | 0.32 |
| 29 | 290 | 384 | 1.8 | 0.04 | 2.24 | 0.33 |
| 30 | 300 | 397 | 1.7 | 0.04 | 2.28 | 0.34 |
| 31 | 310 | 410 | 1.7 | 0.04 | 2.32 | 0.34 |
| 32 | 320 | 423 | 1.6 | 0.04 | 2.35 | 0.35 |
| 33 | 330 | 436 | 1.6 | 0.03 | 2.39 | 0.35 |
| 34 | 340 | 449 | 1.5 | 0.03 | 2.43 | 0.36 |
| 35 | 350 | 462 | 1.5 | 0.03 | 2.46 | 0.36 |

FIGURE 9 (PART 2)

| | | |
|---|---|---|
| Disk thickness | 10 mm | |
| Disk diameter | 100 mm | |
| Disks/layer | 4 | |
| Thickness of: | | FIGURE 10 (PART 1) |
| inner plates | 3 mm | |
| outer plates | 5 mm | |
| Area/disk | 7854 mm2 | |
| Perimeter/disk | 314 mm | |
| Shape Factor/disk | 2.50 | |
| Comp. modulus | 17.44 N/mm2 | |
| Comp. stiffness/disk | 13.58 kN/mm | |
| Shear stiffness/disk | 0.353 kN/mm | |
| Comp. strain @ zero shear | 0.100 | |
| Rated load @ zero shear | 54.3 kN | |
| equivalent to | 5536 kg | |
| Actual load | 5000 kg = | 90% of rated load |

| no. layers | Heights | | Comp. stiff | Shear stiff | Period | |
|---|---|---|---|---|---|---|
| | rubber mm | total mm | kN/mm | kN/mm | Horiz sec | Vert sec |
| 1 | 10 | 20 | 54.3 | 1.41 | 0.37 | 0.06 |
| 5 | 50 | 72 | 10.9 | 0.28 | 0.84 | 0.13 |
| 6 | 60 | 85 | 9.1 | 0.24 | 0.92 | 0.15 |
| 10 | 100 | 137 | 5.4 | 0.14 | 1.18 | 0.19 |
| 11 | 110 | 150 | 4.9 | 0.13 | 1.24 | 0.20 |
| 12 | 120 | 163 | 4.5 | 0.12 | 1.29 | 0.21 |
| 13 | 130 | 176 | 4.2 | 0.11 | 1.35 | 0.22 |
| 14 | 140 | 189 | 3.9 | 0.10 | 1.40 | 0.23 |
| 15 | 150 | 202 | 3.6 | 0.09 | 1.45 | 0.23 |
| 16 | 160 | 215 | 3.4 | 0.09 | 1.49 | 0.24 |
| 17 | 170 | 228 | 3.2 | 0.08 | 1.54 | 0.25 |

| | | | | | | |
|---|---|---|---|---|---|---|
| 18 | 180 | 241 | 3.0 | 0.08 | 1.59 | 0.26 |
| 19 | 190 | 254 | 2.9 | 0.07 | 1.63 | 0.26 |
| 20 | 200 | 267 | 2.7 | 0.07 | 1.67 | 0.27 |
| 21 | 210 | 280 | 2.6 | 0.07 | 1.71 | 0.28 |
| 22 | 220 | 293 | 2.5 | 0.06 | 1.75 | 0.28 |
| 23 | 230 | 306 | 2.4 | 0.06 | 1.79 | 0.29 |
| 24 | 240 | 319 | 2.3 | 0.06 | 1.83 | 0.30 |
| 25 | 250 | 332 | 2.2 | 0.06 | 1.87 | 0.30 |
| 26 | 260 | 345 | 2.1 | 0.05 | 1.91 | 0.31 |
| 27 | 270 | 358 | 2.0 | 0.05 | 1.94 | 0.31 |
| 28 | 280 | 371 | 1.9 | 0.05 | 1.98 | 0.32 |
| 29 | 290 | 384 | 1.9 | 0.05 | 2.01 | 0.32 |
| 30 | 300 | 397 | 1.8 | 0.05 | 2.05 | 0.33 |
| 31 | 310 | 410 | 1.8 | 0.05 | 2.08 | 0.34 |
| 32 | 320 | 423 | 1.7 | 0.04 | 2.11 | 0.34 |
| 33 | 330 | 436 | 1.6 | 0.04 | 2.15 | 0.35 |
| 34 | 340 | 449 | 1.6 | 0.04 | 2.18 | 0.35 |
| 35 | 350 | 462 | 1.6 | 0.04 | 2.21 | 0.36 |

FIGURE 10 (PART 2)

| | | |
|---|---|---|
| Disk thickness | 10 mm | |
| Disk diameter | 130 mm | |
| Disks/layer | 4 | |
| Thickness of: | | FIGURE 11 (PART 1) |
| inner plates | 3 mm | |
| outer plates | 5 mm | |
| Area/disk | 13273 mm2 | |
| Perimeter/disk | 408 mm | |
| Shape Factor/disk | 3.25 | |
| Comp. modulus | 18.99 N/mm2 | |
| Comp. stiffness/disk | 24.97 kN/mm | |
| Shear stiffness/disk | 0.398 kN/mm | |
| Comp. strain @ zero shear | 0.100 | |
| Rated load @ zero shear | 99.9 kN | |
| equivalent to | 10183 kg | |
| Actual load | 10000 kg = | 98% of rated load |

| no. layers | Heights rubber mm | total mm | Comp. stiff kN/mm | Shear stiff kN/mm | Period Horiz sec | Vert sec |
|---|---|---|---|---|---|---|
| 1 | 10 | 20 | 99.9 | 1.59 | 0.50 | 0.06 |
| 5 | 50 | 72 | 20.0 | 0.32 | 1.11 | 0.14 |
| 6 | 60 | 85 | 16.6 | 0.27 | 1.22 | 0.15 |
| 10 | 100 | 137 | 10.0 | 0.16 | 1.57 | 0.20 |
| 11 | 110 | 150 | 9.1 | 0.14 | 1.65 | 0.21 |
| 12 | 120 | 163 | 8.3 | 0.13 | 1.72 | 0.22 |
| 13 | 130 | 176 | 7.7 | 0.12 | 1.80 | 0.23 |
| 14 | 140 | 189 | 7.1 | 0.11 | 1.86 | 0.24 |
| 15 | 150 | 202 | 6.7 | 0.11 | 1.93 | 0.24 |
| 16 | 160 | 215 | 6.2 | 0.10 | 1.99 | 0.25 |
| 17 | 170 | 228 | 5.9 | 0.09 | 2.05 | 0.26 |

| | | | | | | |
|---|---|---|---|---|---|---|
| 18 | 180 | 241 | 5.5 | 0.09 | 2.11 | 0.27 |
| 19 | 190 | 254 | 5.3 | 0.08 | 2.17 | 0.27 |
| 20 | 200 | 267 | 5.0 | 0.08 | 2.23 | 0.28 |
| 21 | 210 | 280 | 4.8 | 0.08 | 2.28 | 0.29 |
| 22 | 220 | 293 | 4.5 | 0.07 | 2.34 | 0.29 |
| 23 | 230 | 306 | 4.3 | 0.07 | 2.39 | 0.30 |
| 24 | 240 | 319 | 4.2 | 0.07 | 2.44 | 0.31 |
| 25 | 250 | 332 | 4.0 | 0.06 | 2.49 | 0.31 |
| 26 | 260 | 345 | 3.8 | 0.06 | 2.54 | 0.32 |
| 27 | 270 | 358 | 3.7 | 0.06 | 2.59 | 0.33 |
| 28 | 280 | 371 | 3.6 | 0.06 | 2.63 | 0.33 |
| 29 | 290 | 384 | 3.4 | 0.05 | 2.68 | 0.34 |
| 30 | 300 | 397 | 3.3 | 0.05 | 2.73 | 0.34 |
| 31 | 310 | 410 | 3.2 | 0.05 | 2.77 | 0.35 |
| 32 | 320 | 423 | 3.1 | 0.05 | 2.82 | 0.36 |
| 33 | 330 | 436 | 3.0 | 0.05 | 2.86 | 0.36 |
| 34 | 340 | 449 | 2.9 | 0.05 | 2.90 | 0.37 |
| 35 | 350 | 462 | 2.9 | 0.05 | 2.95 | 0.37 |

FIGURE 11 (PART 2)

| | | FIGURE 12 (PART 1) |
|---|---|---|
| Disk thickness | 10 mm | |
| Disk diameter | 110 mm | |
| Disks/layer | 4 | |
| Thickness of: | | |
| inner plates | 3 mm | |
| outer plates | 5 mm | |
| Area/disk | 9503 mm2 | |
| Perimeter/disk | 346 mm | |
| Shape Factor/disk | 2.75 | |
| Comp. modulus | 26.49 N/mm2 | |
| Comp. stiffness/disk | 24.85 kN/mm | |
| Shear stiffness/disk | 0.608 kN/mm | |
| Comp. strain @ zero shear | 0.100 | |
| Rated load @ zero shear | 99.4 kN | |
| equivalent to | 10131 kg | |
| Actual load | 10000 kg = | 99% of rated load |

| no. layers | Heights | | Comp. stiff | Shear stiff | Period | |
|---|---|---|---|---|---|---|
| | rubber mm | total mm | kN/mm | kN/mm | Horiz sec | Vert sec |
| 1 | 10 | 20 | 99.4 | 2.43 | 0.40 | 0.06 |
| 5 | 50 | 72 | 19.9 | 0.49 | 0.90 | 0.14 |
| 6 | 60 | 85 | 16.6 | 0.41 | 0.99 | 0.15 |
| 10 | 100 | 137 | 9.9 | 0.24 | 1.27 | 0.20 |
| 11 | 110 | 150 | 9.0 | 0.22 | 1.34 | 0.21 |
| 12 | 120 | 163 | 8.3 | 0.20 | 1.40 | 0.22 |
| 13 | 130 | 176 | 7.6 | 0.19 | 1.45 | 0.23 |
| 14 | 140 | 189 | 7.1 | 0.17 | 1.51 | 0.24 |
| 15 | 150 | 202 | 6.6 | 0.16 | 1.56 | 0.24 |
| 16 | 160 | 215 | 6.2 | 0.15 | 1.61 | 0.25 |
| 17 | 170 | 228 | 5.8 | 0.14 | 1.66 | 0.26 |

| | | | | | | |
|---|---|---|---|---|---|---|
| 18 | 180 | 241 | 5.5 | 0.14 | 1.71 | 0.27 |
| 19 | 190 | 254 | 5.2 | 0.13 | 1.76 | 0.27 |
| 20 | 200 | 267 | 5.0 | 0.12 | 1.80 | 0.28 |
| 21 | 210 | 280 | 4.7 | 0.12 | 1.85 | 0.29 |
| 22 | 220 | 293 | 4.5 | 0.11 | 1.89 | 0.30 |
| 23 | 230 | 306 | 4.3 | 0.11 | 1.93 | 0.30 |
| 24 | 240 | 319 | 4.1 | 0.10 | 1.97 | 0.31 |
| 25 | 250 | 332 | 4.0 | 0.10 | 2.01 | 0.32 |
| 26 | 260 | 345 | 3.8 | 0.09 | 2.05 | 0.32 |
| 27 | 270 | 358 | 3.7 | 0.09 | 2.09 | 0.33 |
| 28 | 280 | 371 | 3.5 | 0.09 | 2.13 | 0.33 |
| 29 | 290 | 384 | 3.4 | 0.08 | 2.17 | 0.34 |
| 30 | 300 | 397 | 3.3 | 0.08 | 2.21 | 0.35 |
| 31 | 310 | 410 | 3.2 | 0.08 | 2.24 | 0.35 |
| 32 | 320 | 423 | 3.1 | 0.08 | 2.28 | 0.36 |
| 33 | 330 | 436 | 3.0 | 0.07 | 2.31 | 0.36 |
| 34 | 340 | 449 | 2.9 | 0.07 | 2.35 | 0.37 |
| 35 | 350 | 462 | 2.8 | 0.07 | 2.38 | 0.37 |

FIGURE 12 (PART 2)

| | | |
|---|---|---|
| Disk thickness | 10 mm | |
| Disk diameter | 130 mm | |
| Disks/layer | 4 | |
| Thickness of: | | FIGURE 13 (PART 1) |
| inner plates | 3 mm | |
| outer plates | 5 mm | |
| Area/disk | 13273 mm2 | |
| Perimeter/disk | 408 mm | |
| Shape Factor/disk | 3.25 | |
| Comp. modulus | 28.43 N/mm2 | |
| Comp. stiffness/disk | 37.21 kN/mm | |
| Shear stiffness/disk | 0.597 kN/mm | |
| Comp. strain @ zero shear | 0.100 | |
| Rated load @ zero shear | 148.9 kN | |
| equivalent to | 15173 kg | |

Actual load             15000 kg  =      99% of rated load

| no. layers | Heights rubber mm | total mm | Comp. stiff kN/mm | Shear stiff kN/mm | Period Horiz sec | Vert sec |
|---|---|---|---|---|---|---|
| 1 | 10 | 20 | 148.9 | 2.39 | 0.50 | 0.06 |
| 5 | 50 | 72 | 29.9 | 0.48 | 1.11 | 0.14 |
| 6 | 60 | 85 | 24.8 | 0.40 | 1.22 | 0.15 |
| 10 | 100 | 137 | 14.9 | 0.24 | 1.57 | 0.20 |
| 11 | 110 | 150 | 13.5 | 0.22 | 1.65 | 0.21 |
| 12 | 120 | 163 | 12.4 | 0.20 | 1.72 | 0.22 |
| 13 | 130 | 176 | 11.5 | 0.18 | 1.80 | 0.23 |
| 14 | 140 | 189 | 10.6 | 0.17 | 1.86 | 0.24 |
| 15 | 150 | 202 | 9.9 | 0.16 | 1.93 | 0.24 |
| 16 | 160 | 215 | 9.3 | 0.15 | 1.99 | 0.25 |
| 17 | 170 | 228 | 8.8 | 0.14 | 2.05 | 0.26 |

| | | | | | | |
|---|---|---|---|---|---|---|
| 18 | 180 | 241 | 8.3 | 0.13 | 2.11 | 0.27 |
| 19 | 190 | 254 | 7.8 | 0.13 | 2.17 | 0.27 |
| 20 | 200 | 267 | 7.4 | 0.12 | 2.23 | 0.28 |
| 21 | 210 | 280 | 7.1 | 0.11 | 2.28 | 0.29 |
| 22 | 220 | 293 | 6.8 | 0.11 | 2.34 | 0.30 |
| 23 | 230 | 306 | 6.5 | 0.10 | 2.39 | 0.30 |
| 24 | 240 | 319 | 6.2 | 0.10 | 2.44 | 0.31 |
| 25 | 250 | 332 | 6.0 | 0.10 | 2.49 | 0.32 |
| 26 | 260 | 345 | 5.7 | 0.09 | 2.54 | 0.32 |
| 27 | 270 | 358 | 5.5 | 0.09 | 2.59 | 0.33 |
| 28 | 280 | 371 | 5.3 | 0.09 | 2.63 | 0.33 |
| 29 | 290 | 384 | 5.1 | 0.08 | 2.68 | 0.34 |
| 30 | 300 | 397 | 5.0 | 0.08 | 2.73 | 0.35 |
| 31 | 310 | 410 | 4.8 | 0.08 | 2.77 | 0.35 |
| 32 | 320 | 423 | 4.7 | 0.07 | 2.82 | 0.36 |
| 33 | 330 | 436 | 4.5 | 0.07 | 2.86 | 0.36 |
| 34 | 340 | 449 | 4.4 | 0.07 | 2.90 | 0.37 |
| 35 | 350 | 462 | 4.3 | 0.07 | 2.95 | 0.37 |

FIGURE 13 (PART 2)

| | | |
|---|---|---|
| Disk thickness | 10 mm | |
| Disk diameter | 130 mm | |
| Disks/layer | 4 | |
| Thickness of: | | FIGURE 14 (PART 1) |
| inner plates | 3 mm | |
| outer plates | 5 mm | |
| Area/disk | 13273 mm2 | |
| Perimeter/disk | 408 mm | |
| Shape Factor/disk | 3.25 | |
| Comp. modulus | 36.13 N/mm2 | |
| Comp. stiffness/disk | 47.10 kN/mm | |
| Shear stiffness/disk | 0.849 kN/mm | |
| Comp. strain @ zero shear | 0.100 | |
| Rated load @ zero shear | 188.4 kN | |
| equivalent to | 19205 kg | |

| | | | |
|---|---|---|---|
| Actual load | 15000 kg | = | 78% of rated load |

| no. layers | Heights | | Comp. stiff | Shear stiff | Period | |
|---|---|---|---|---|---|---|
| | rubber mm | total mm | kN/mm | kN/mm | Horiz sec | Vert sec |
| 1 | 10 | 20 | 188.4 | 3.40 | 0.42 | 0.06 |
| 5 | 50 | 72 | 37.7 | 0.68 | 0.93 | 0.13 |
| 6 | 60 | 85 | 31.4 | 0.57 | 1.02 | 0.14 |
| 10 | 100 | 137 | 18.8 | 0.34 | 1.32 | 0.18 |
| 11 | 110 | 150 | 17.1 | 0.31 | 1.38 | 0.19 |
| 12 | 120 | 163 | 15.7 | 0.28 | 1.45 | 0.19 |
| 13 | 130 | 176 | 14.5 | 0.26 | 1.51 | 0.20 |
| 14 | 140 | 189 | 13.5 | 0.24 | 1.56 | 0.21 |
| 15 | 150 | 202 | 12.6 | 0.23 | 1.62 | 0.22 |
| 16 | 160 | 215 | 11.8 | 0.21 | 1.67 | 0.22 |
| 17 | 170 | 228 | 11.1 | 0.20 | 1.72 | 0.23 |

| | | | | | | |
|---|---|---|---|---|---|---|
| 18 | 180 | 241 | 10.5 | 0.19 | 1.77 | 0.24 |
| 19 | 190 | 254 | 9.9 | 0.18 | 1.82 | 0.24 |
| 20 | 200 | 267 | 9.4 | 0.17 | 1.87 | 0.25 |
| 21 | 210 | 280 | 9.0 | 0.16 | 1.91 | 0.26 |
| 22 | 220 | 293 | 8.6 | 0.15 | 1.96 | 0.26 |
| 23 | 230 | 306 | 8.2 | 0.15 | 2.00 | 0.27 |
| 24 | 240 | 319 | 7.9 | 0.14 | 2.05 | 0.27 |
| 25 | 250 | 332 | 7.5 | 0.14 | 2.09 | 0.28 |
| 26 | 260 | 345 | 7.2 | 0.13 | 2.13 | 0.29 |
| 27 | 270 | 358 | 7.0 | 0.13 | 2.17 | 0.29 |
| 28 | 280 | 371 | 6.7 | 0.12 | 2.21 | 0.30 |
| 29 | 290 | 384 | 6.5 | 0.12 | 2.25 | 0.30 |
| 30 | 300 | 397 | 6.3 | 0.11 | 2.29 | 0.31 |
| 31 | 310 | 410 | 6.1 | 0.11 | 2.32 | 0.31 |
| 32 | 320 | 423 | 5.9 | 0.11 | 2.36 | 0.32 |
| 33 | 330 | 436 | 5.7 | 0.10 | 2.40 | 0.32 |
| 34 | 340 | 449 | 5.5 | 0.10 | 2.43 | 0.33 |
| 35 | 350 | 462 | 5.4 | 0.10 | 2.47 | 0.33 |

FIGURE 14 (PART 2)

| | | |
|---|---|---|
| Disk thickness | 10 mm | |
| Disk diameter | 150 mm | |
| Disks/layer | 4 | |
| Thickness of: | | FIGURE 15 (PART 1) |
| inner plates | 3 mm | |
| outer plates | 5 mm | |
| Area/disk | 17671 mm2 | |
| Perimeter/disk | 471 mm | |
| Shape Factor/disk | 3.75 | |
| Comp. modulus | 37.36 N/mm2 | |
| Comp. stiffness/disk | 64.81 kN/mm | |
| Shear stiffness/disk | 0.795 kN/mm | |
| Comp. strain @ zero shear | 0.100 | |
| Rated load @ zero shear | 259.2 kN | |
| equivalent to | 26426 kg | |

| | | | |
|---|---|---|---|
| Actual load | 20000 kg = | 76% of rated load | |

| no. | Heights | | Comp. | Shear | Period | |
|---|---|---|---|---|---|---|
| layers | rubber | total | stiff | stiff | Horiz | Vert |
| | mm | mm | kN/mm | kN/mm | sec | sec |
| 1 | 10 | 20 | 259.2 | 3.18 | 0.50 | 0.06 |
| 5 | 50 | 72 | 51.8 | 0.64 | 1.11 | 0.12 |
| 6 | 60 | 85 | 43.2 | 0.53 | 1.22 | 0.14 |
| 7 | 70 | 98 | 37.0 | 0.45 | 1.32 | 0.15 |
| 8 | 80 | 111 | 32.4 | 0.40 | 1.41 | 0.16 |
| 9 | 90 | 124 | 28.8 | 0.35 | 1.49 | 0.17 |
| 10 | 100 | 137 | 25.9 | 0.32 | 1.58 | 0.17 |
| 11 | 110 | 150 | 23.6 | 0.29 | 1.65 | 0.18 |
| 12 | 120 | 163 | 21.6 | 0.27 | 1.73 | 0.19 |
| 13 | 130 | 176 | 19.9 | 0.24 | 1.80 | 0.20 |
| 14 | 140 | 189 | 18.5 | 0.23 | 1.86 | 0.21 |

| | | | | | | |
|---|---|---|---|---|---|---|
| 15 | 150 | 202 | 17.3 | 0.21 | 1.93 | 0.21 |
| 16 | 160 | 215 | 16.2 | 0.20 | 1.99 | 0.22 |
| 17 | 170 | 228 | 15.2 | 0.19 | 2.05 | 0.23 |
| 18 | 180 | 241 | 14.4 | 0.18 | 2.11 | 0.23 |
| 19 | 190 | 254 | 13.6 | 0.17 | 2.17 | 0.24 |
| 20 | 200 | 267 | 13.0 | 0.16 | 2.23 | 0.25 |
| 21 | 210 | 280 | 12.3 | 0.15 | 2.28 | 0.25 |
| 22 | 220 | 293 | 11.8 | 0.14 | 2.34 | 0.26 |
| 23 | 230 | 306 | 11.3 | 0.14 | 2.39 | 0.26 |
| 24 | 240 | 319 | 10.8 | 0.13 | 2.44 | 0.27 |
| 25 | 250 | 332 | 10.4 | 0.13 | 2.49 | 0.28 |
| 26 | 260 | 345 | 10.0 | 0.12 | 2.54 | 0.28 |
| 27 | 270 | 358 | 9.6 | 0.12 | 2.59 | 0.29 |
| 28 | 280 | 371 | 9.3 | 0.11 | 2.64 | 0.29 |
| 29 | 290 | 384 | 8.9 | 0.11 | 2.68 | 0.30 |
| 30 | 300 | 397 | 8.6 | 0.11 | 2.73 | 0.30 |
| 31 | 310 | 410 | 8.4 | 0.10 | 2.77 | 0.31 |
| 32 | 320 | 423 | 8.1 | 0.10 | 2.82 | 0.31 |

FIGURE 15 (PART 2)

| | | |
|---|---|---|
| Disk thickness | 10 mm | |
| Disk diameter | 140 mm | |
| Disks/layer | 4 | |
| Thickness of: | | FIGURE 16 (PART 1) |
| inner plates | 3 mm | |
| outer plates | 5 mm | |
| Area/disk | 15394 mm2 | |
| Perimeter/disk | 440 mm | |
| Shape Factor/disk | 3.50 | |
| Comp. modulus | 41.55 N/mm2 | |
| Comp. stiffness/disk | 62.66 kN/mm | |
| Shear stiffness/disk | 0.985 kN/mm | |
| Comp. strain @ zero shear | 0.100 | |
| Rated load @ zero shear | 250.6 kN | |
| equivalent to | 25547 kg | |

| Actual load | 20000 kg = | 78% of rated load |
|---|---|---|

| no. layers | Heights rubber mm | total mm | Comp. stiff kN/mm | Shear stiff kN/mm | Period Horiz sec | Vert sec |
|---|---|---|---|---|---|---|
| 1 | 10 | 20 | 250.6 | 3.94 | 0.45 | 0.06 |
| 5 | 50 | 72 | 50.1 | 0.79 | 1.00 | 0.13 |
| 6 | 60 | 85 | 41.8 | 0.66 | 1.10 | 0.14 |
| 7 | 70 | 98 | 35.8 | 0.56 | 1.18 | 0.15 |
| 8 | 80 | 111 | 31.3 | 0.49 | 1.27 | 0.16 |
| 9 | 90 | 124 | 27.8 | 0.44 | 1.34 | 0.17 |
| 10 | 100 | 137 | 25.1 | 0.39 | 1.42 | 0.18 |
| 11 | 110 | 150 | 22.8 | 0.36 | 1.48 | 0.19 |
| 12 | 120 | 163 | 20.9 | 0.33 | 1.55 | 0.19 |
| 13 | 130 | 176 | 19.3 | 0.30 | 1.61 | 0.20 |
| 14 | 140 | 189 | 17.9 | 0.28 | 1.67 | 0.21 |

| | | | | | | |
|---|---|---|---|---|---|---|
| 15 | 150 | 202 | 16.7 | 0.26 | 1.73 | 0.22 |
| 16 | 160 | 215 | 15.7 | 0.25 | 1.79 | 0.22 |
| 17 | 170 | 228 | 14.7 | 0.23 | 1.85 | 0.23 |
| 18 | 180 | 241 | 13.9 | 0.22 | 1.90 | 0.24 |
| 19 | 190 | 254 | 13.2 | 0.21 | 1.95 | 0.24 |
| 20 | 200 | 267 | 12.5 | 0.20 | 2.00 | 0.25 |
| 21 | 210 | 280 | 11.9 | 0.19 | 2.05 | 0.26 |
| 22 | 220 | 293 | 11.4 | 0.18 | 2.10 | 0.26 |
| 23 | 230 | 306 | 10.9 | 0.17 | 2.15 | 0.27 |
| 24 | 240 | 319 | 10.4 | 0.16 | 2.19 | 0.27 |
| 25 | 250 | 332 | 10.0 | 0.16 | 2.24 | 0.28 |
| 26 | 260 | 345 | 9.6 | 0.15 | 2.28 | 0.29 |
| 27 | 270 | 358 | 9.3 | 0.15 | 2.33 | 0.29 |
| 28 | 280 | 371 | 9.0 | 0.14 | 2.37 | 0.30 |
| 29 | 290 | 384 | 8.6 | 0.14 | 2.41 | 0.30 |
| 30 | 300 | 397 | 8.4 | 0.13 | 2.45 | 0.31 |
| 31 | 310 | 410 | 8.1 | 0.13 | 2.49 | 0.31 |
| 32 | 320 | 423 | 7.8 | 0.12 | 2.53 | 0.32 |

FIGURE 16 (PART 2)

| | | |
|---|---|---|
| Disk thickness | 10 mm | |
| Disk diameter | 180 mm | |
| Disks/layer | 4 | |
| Thickness of: | | FIGURE 17 (PART 1) |
| inner plates | 3 mm | |
| outer plates | 5 mm | |
| Area/disk | 25447 mm2 | |
| Perimeter/disk | 565 mm | |
| Shape Factor/disk | 4.50 | |
| Comp. modulus | 67.24 N/mm2 | |
| Comp. stiffness/disk | 165.55 kN/mm | |
| Shear stiffness/disk | 1.629 kN/mm | |
| Comp. strain @ zero shear | 0.080 | |
| Rated load @ zero shear | 531.4 kN | |
| equivalent to | 54168 kg | |
| Actual load | 50000 kg = | 92% of rated load |

| no. layers | Heights rubber mm | total mm | Comp. stiff kN/mm | Shear stiff kN/mm | Period Horiz sec | Vert sec |
|---|---|---|---|---|---|---|
| 1 | 10 | 20 | 662.2 | 6.51 | 0.55 | 0.05 |
| 5 | 50 | 72 | 132.4 | 1.30 | 1.23 | 0.12 |
| 6 | 60 | 85 | 110.4 | 1.09 | 1.35 | 0.13 |
| 7 | 70 | 98 | 94.6 | 0.93 | 1.46 | 0.14 |
| 8 | 80 | 111 | 82.8 | 0.81 | 1.56 | 0.15 |
| 9 | 90 | 124 | 73.6 | 0.72 | 1.65 | 0.16 |
| 10 | 100 | 137 | 66.2 | 0.65 | 1.74 | 0.17 |
| 11 | 110 | 150 | 60.2 | 0.59 | 1.83 | 0.18 |
| 12 | 120 | 163 | 55.2 | 0.54 | 1.91 | 0.19 |
| 13 | 130 | 176 | 50.9 | 0.50 | 1.98 | 0.20 |
| 14 | 140 | 189 | 47.3 | 0.47 | 2.06 | 0.20 |

| | | | | | | |
|---|---|---|---|---|---|---|
| 15 | 150 | 202 | 44.1 | 0.43 | 2.13 | 0.21 |
| 16 | 160 | 215 | 41.4 | 0.41 | 2.20 | 0.22 |
| 17 | 170 | 228 | 39.0 | 0.38 | 2.27 | 0.23 |
| 18 | 180 | 241 | 36.8 | 0.36 | 2.34 | 0.23 |
| 19 | 190 | 254 | 34.9 | 0.34 | 2.40 | 0.24 |
| 20 | 200 | 267 | 33.1 | 0.33 | 2.46 | 0.24 |
| 21 | 210 | 280 | 31.5 | 0.31 | 2.52 | 0.25 |
| 22 | 220 | 293 | 30.1 | 0.30 | 2.58 | 0.26 |
| 23 | 230 | 306 | 28.8 | 0.28 | 2.64 | 0.26 |
| 24 | 240 | 319 | 27.6 | 0.27 | 2.70 | 0.27 |
| 25 | 250 | 332 | 26.5 | 0.26 | 2.75 | 0.27 |
| 26 | 260 | 345 | 25.5 | 0.25 | 2.81 | 0.28 |
| 27 | 270 | 358 | 24.5 | 0.24 | 2.86 | 0.28 |
| 28 | 280 | 371 | 23.6 | 0.23 | 2.91 | 0.29 |
| 29 | 290 | 384 | 22.8 | 0.22 | 2.96 | 0.29 |
| 30 | 300 | 397 | 22.1 | 0.22 | 3.02 | 0.30 |
| 31 | 310 | 410 | 21.4 | 0.21 | 3.06 | 0.30 |
| 32 | 320 | 423 | 20.7 | 0.20 | 3.11 | 0.31 |

FIGURE 17 (PART 2)

| | | |
|---|---|---|
| Disk thickness | 10 mm | |
| Disk diameter | 200 mm | |
| Disks/layer | 4 | |
| Thickness of: | | FIGURE 18 (PART 1) |
| inner plates | 3 mm | |
| outer plates | 5 mm | |
| Area/disk | 31416 mm2 | |
| Perimeter/disk | 628 mm | |
| Shape Factor/disk | 5.00 | |
| Comp. modulus | 131.28 N/mm2 | |
| Comp. stiffness/disk | 387.01 kN/mm | |
| Shear stiffness/disk | 3.330 kN/mm | |
| Comp. strain @ zero shear | 0.067 | |
| Rated load @ zero shear | 1032.0 kN | |
| equivalent to | 105202 kg | |
| Actual load | 100000 kg = | 95% of rated load |

| no. layers | Heights rubber mm | total mm | Comp. stiff kN/mm | Shear stiff kN/mm | Period Horiz sec | Vert sec |
|---|---|---|---|---|---|---|
| 1 | 10 | 20 | 1548.0 | 13.32 | 0.54 | 0.05 |
| 5 | 50 | 72 | 309.6 | 2.66 | 1.22 | 0.11 |
| 6 | 60 | 85 | 258.0 | 2.22 | 1.33 | 0.12 |
| 7 | 70 | 98 | 221.1 | 1.90 | 1.44 | 0.13 |
| 8 | 80 | 111 | 193.5 | 1.67 | 1.54 | 0.14 |
| 9 | 90 | 124 | 172.0 | 1.48 | 1.63 | 0.15 |
| 10 | 100 | 137 | 154.8 | 1.33 | 1.72 | 0.16 |
| 11 | 110 | 150 | 140.7 | 1.21 | 1.81 | 0.17 |
| 12 | 120 | 163 | 129.0 | 1.11 | 1.89 | 0.17 |
| 13 | 130 | 176 | 119.1 | 1.02 | 1.96 | 0.18 |
| 14 | 140 | 189 | 110.6 | 0.95 | 2.04 | 0.19 |

| | | | | | | |
|---|---|---|---|---|---|---|
| 15 | 150 | 202 | 103.2 | 0.89 | 2.11 | 0.20 |
| 16 | 160 | 215 | 96.8 | 0.83 | 2.18 | 0.20 |
| 17 | 170 | 228 | 91.1 | 0.78 | 2.24 | 0.21 |
| 18 | 180 | 241 | 86.0 | 0.74 | 2.31 | 0.21 |
| 19 | 190 | 254 | 81.5 | 0.70 | 2.37 | 0.22 |
| 20 | 200 | 267 | 77.4 | 0.67 | 2.43 | 0.23 |
| 21 | 210 | 280 | 73.7 | 0.63 | 2.49 | 0.23 |
| 22 | 220 | 293 | 70.4 | 0.61 | 2.55 | 0.24 |
| 23 | 230 | 306 | 67.3 | 0.58 | 2.61 | 0.24 |
| 24 | 240 | 319 | 64.5 | 0.56 | 2.67 | 0.25 |
| 25 | 250 | 332 | 61.9 | 0.53 | 2.72 | 0.25 |
| 26 | 260 | 345 | 59.5 | 0.51 | 2.78 | 0.26 |
| 27 | 270 | 358 | 57.3 | 0.49 | 2.83 | 0.26 |
| 28 | 280 | 371 | 55.3 | 0.48 | 2.88 | 0.27 |
| 29 | 290 | 384 | 53.4 | 0.46 | 2.93 | 0.27 |
| 30 | 300 | 397 | 51.6 | 0.44 | 2.98 | 0.28 |
| 31 | 310 | 410 | 49.9 | 0.43 | 3.03 | 0.28 |
| 32 | 320 | 423 | 48.4 | 0.42 | 3.08 | 0.29 |

FIGURE 18 (PART 2)

HIGH STABILITY ASEISMIC BEARING

FIELD OF THE INVENTION

The invention relates to bearings and more particularly to bearings of the type suitable for supporting machinery, plant and other loads relative to a base structure to protect the load against horizontal shear forces.

BACKGROUND TO THE INVENTION

At present in a number of industries and situations there are advantages to be gained from mounting plant and machinery on a bearing or bearings so that in, for example, earthquake situations any horizontal shear forces created are to an extent absorbed to therefore minimise the likelihood of damage to the plant or machinery.

An object of the present invention is to provide a bearing for plant or machinery which bearing is capable of absorbing to a large extent horizontal shear forces.

Further objects and advantages of the present invention will become apparent from the following description which is given by way of example only.

SUMMARY OF THE INVENTION

According to a broadest aspect of the invention there is provided a high stability bearing, the bearing including two or more plates each of which has three or more disc shaped bearings mounted on or formed integrally with a surface or surfaces thereof, the disc shaped bearings and adjacent plates being joined together to form a bearing assembly with the three or more disc shaped bearings being linked or stiffened by the plates to form a stable unit.

According to a second aspect of the invention there is provide a bearing assembly including a plurality of plates eack linked to the plate or plates adjacent thereto by three or more disc shaped bearings, the arrangement being such that in the assembly the discs form three or more columnar bearings held together by the linked plates to form a stable unit.

The disc shaped bearings are preferably constructed from a synthetic or natural rubber material having a shore hardness in the range of about 30 to 80.

The disc shaped bearings can be formed in two parts from sections formed integrally with or attached to the plate or plates positioned above or below. The plates can be constructed from any suitable planar stiff or rigid material, for example, stainless steel or a rigid rubber material.

Each plate or an assembled set of plates can have a skirt which protects the interior of the assembly against the ingress of deleterious matter to the space or spaces between adjacent plates.

The invention can also include the provision of damping within the bearing by incorporating an energy absorbing component or components within or between the layers of the bearing. The energy absorbing component(s) can be within or between the layers of the plates and/or attached to them, the component(s) absorbing energy when deformed by shear movement between the plates. The component(s) can be of steel, lead or of a polymeric material of moderate viscosity. The latter can be trapped between rubber rings bonded to the steel plates.

Alternatively the energy absorption can be achieved by a sliding component or components of a polymeric material, for example polytetrafluoroethylene, which is (are) attached on one side to a plate and on the other allowed to slide, either lubricated or unlubricated, against a stainless steel face on an adjacent plate.

Further aspects of the invention which should be considered in all its novel aspects will become apparent from the following descriptions which are given by way of example only.

BRIEF DESCRIPTION OF THE DRAWINGS

FIG. 4 shows a table indicating details of example of bearing for which FIGS. 5 to 18 give the characteristics thereof

DESCRIPTION OF PREFERRED EMBODIMENTS

Figure 1:
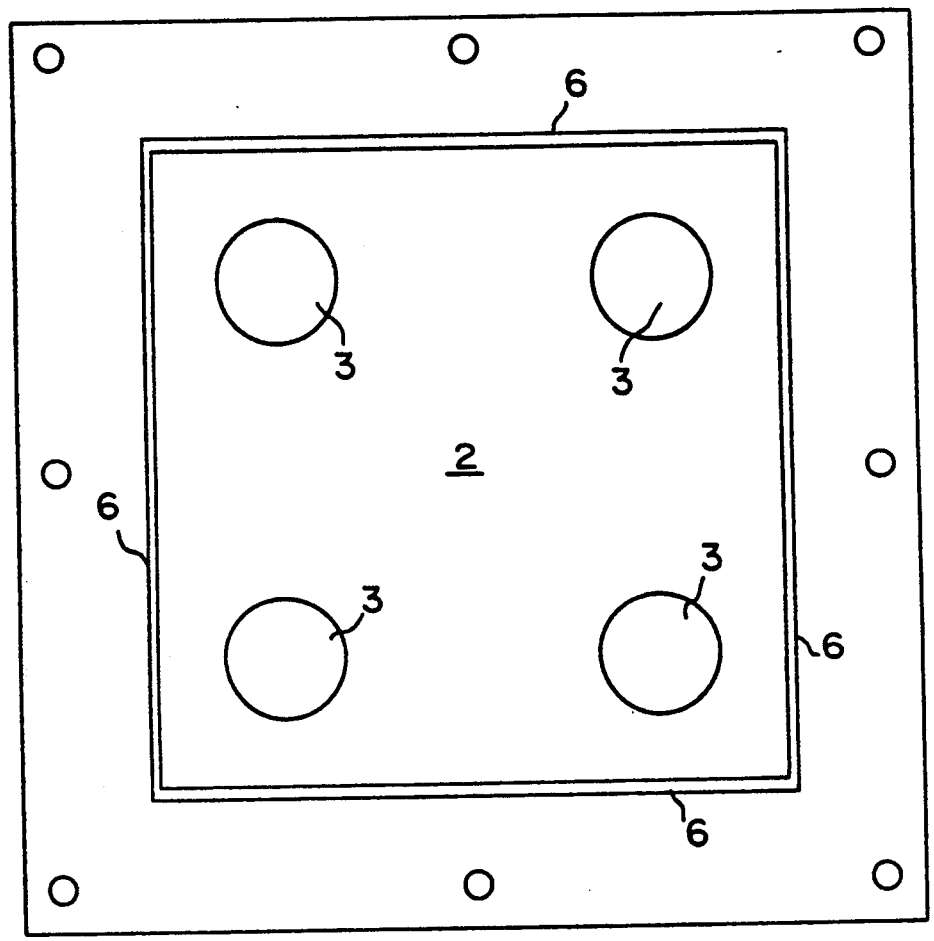
FIG. 1 shows a perspective view from below of one example of plate usable in a bearing assembly according to the invention
Figure 2:
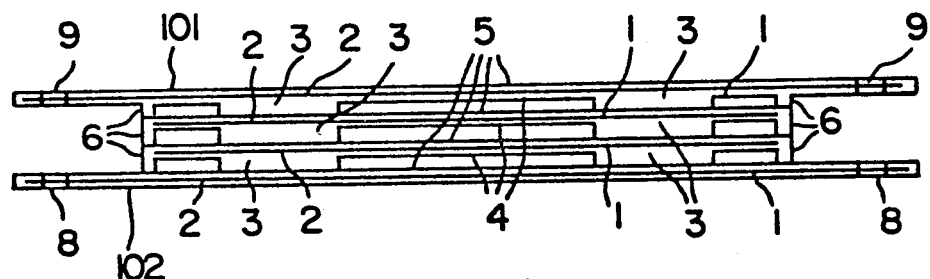
FIG. 2 shows a side view of a bearing assembly built from a plurality of plates of the type shown in FIG. 1

Embodiments of bearing according to the present invention will now be described with reference to the accompanying drawings and an example of specific use. The embodiment of bearing assembly shown in FIGS. 1 and 2 is one of a series of similar bearing assemblies designed for placement beneath a generator, transformer or the like item of electrical machinary forming part of an electricity supply system.

The bearing assembly shown in FIGS. 1 and 2 consists of a series of similar bearing plates an example of one of which is shown in detail from below in FIG. 1. Each bearing plate 1 includes of a planar member 2.

The planar member 2 has either on its upper surface or lower surface three or four disc shaped bearings. In FIG. 1 the bearing plate 1 incorporates four discs 3 on its lower surface 4.

The plate 1 can be constructed from any suitably stiff material, for example stainless steel or a rigid rubber material.

The discs 3 are bonded to or formed integrally with the surface(s) of the plate 1.

The disc shaped bearings 3 are manufactured from a synthetic or natural rubber material which has a shore hardness of between 30 to 80. This theoretically allows for a deflection of up to 200% of the rubber thickness as a horizontal displacement.

As is shown in FIG. 2 an assembly of similar plates 1 including an uppermost plate 101 and a lowermost plate 102 with upper surface 5 and lower surfaces 4, are mounted together by bonding the discs 3 to adjacent plates. The lowermost plate 102 has a series of bolt holes 8 for mounting the lowermost plate 102 of the bearing assembly to a foundation. The uppermost plate 101 also includes similar mounting holes 9 around its periphery. The mounting holes 9 are suitably positioned for mounting an item of machinery or a load thereon.

The aligned and bonded discs 3 form spaced apart columnar bearings which in practice are relatively tall which would normally have inherent stability problems. The stability problem is substantially eliminated by plates which tie and stiffen the assembly to form a stable bearing assembly unit.

Advantageously as shown in FIG. 1 the periphery of each plate 1 has a skirt 6 downwardly depending therefrom.

The provision of the skirt 6 has advantages other than keeping deleterious material from between adjacent plates 1. When the bearing assembly is absorbing a horizontal shear force, each skirt 6 tends to act as a damper because of its frictional contact with the plate therebeneath.

Figure 3:
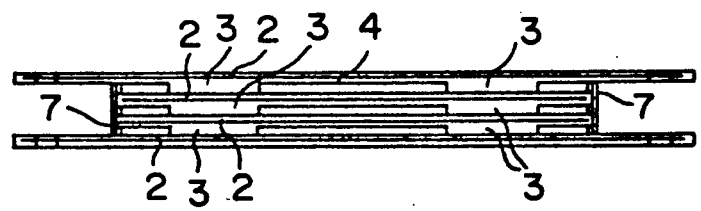
FIG. 3 shows a sectional view of an alternative construction of bearing assembly according to the invention which includes a peripheral skirt

An alternative construction is shown in FIG. 3 in which the skirts 6 are replaced by a single peripheral skirt 7 which surround the complete bearing assembly.

In use a required number of bearing assemblies are mounted on foundations and the overall size and characteristics the individual bearings is selected to suit the load to be supported thereon and the degree of protection required.

A range of bearings incorporating the invention are described in FIGS. 4 to 18. The range is not all inclusive but shows the wide variety of configurations available. Details in the bearings of table are shown in FIG. 4 are detailed in FIGS. 5 to 18. The bearings are manufactured within the following constraints:

No. of layers—variable
Plan Size—variable
Disk diameter—variable
Disk thickness—over 8 mm
Rubber hardness—30 to 80 Shore A Consideration must be given to the following when a bearing is designed:

(1) Stability—overall height of the bearing should not exceed approximately ⅔ of the minimum plan dimension of the steel plates.
(2) Steel plate size—should be approximately 3.5 to 4 times the disk diameter.

In practice the load bearing characteristics of each bearing assembly is selected to suit a particular period of oscillation in horizontal shear.

The test and calculated recommendations shown in FIGS. 5 to 18 are for a range of bearings having capacities up to 20 tons. The recommendations incorporate variations in rubber disc dimensions which allow for any design requirement for natural period of oscillation, typically for most designs being in the range 1 to 3 seconds. They also allow for the required design horizontal deflection, which for most earthquake loadings is up to 150 mm is any horizontal direction from the at rest position.

The use of a stiffening plate(s) linking together the columnar bearings provides improved load bearing and shear resistant characteristics in the assembled bearing.

Figure 19:
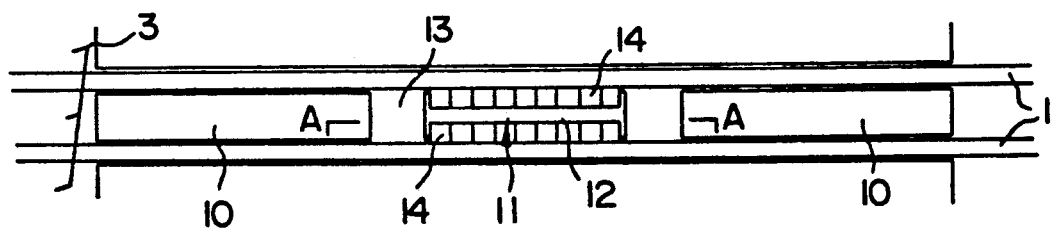
FIG. 19 shows a sectional view of part of a bearing assembly which includes the provision of damping
Figure 20:
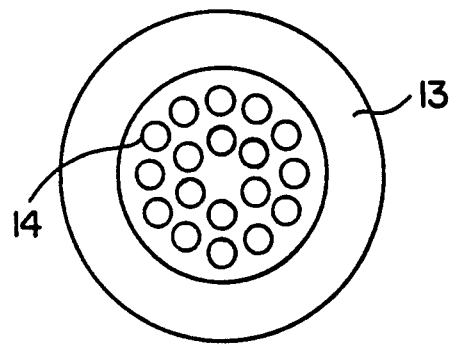
FIG. 20 shows a sectional view of the damping region which is indicated by arrows A—A in FIG. 19.

In FIGS. 19 and 20 are shown details of a bearing assembly with damping components. The parts of the assembly have the same identification numerals as the bearing shown in FIGS. 1 and 2. The plates 1 are 3 mm steel plates with disc shaped bearings 3 which form a cavity 10 in the centre of which a damping means indicated generally by arrow 11. The damping means includes a cavity 12 formed by an annular member 13 (FIG. 20) in which are a series of discrete components 14 spaced apart in the cavity 12. The components 14 are fixed to the plates 1 and the space is filled with a polymeric material, for example, a silicone polymer, bitumen having a moderate viscosity and having characteristics which absorb horizontal shear forces.

In use any shear forces are absorbed by the polymeric material therefore minimising movement in the bearing assembly.

Thus by this invention there is provided a high stability bearing for plant or machinery which is capable of absorbing to a large extent horizontal shear forces.

Particular embodiments of the invention have been described and it is envisaged that improvements and modifications can take place without departing from the scope and spirit of the appended claims.

What we do claim and desire to obtain by Letters Patent of the United States is:

1. A high stability structural bearing for placement between members of a structure, the bearing comprising:
   a plurality of adjacent metal stiffening plates constructed from a planar, stiff and rigid material, each plate having a plurality of discrete, spaced-apart resilient disc shaped bearings on a surface thereof abutting a surface of an adjacent plate, the stiffening plates and the disc shaped bearings providing a layered bearing assembly in which the disc shaped bearings of adjacent plates provide generally columnar resilient bearings stiffened by the matal plates to form a stable bearing unit for protecting members of the structure against horizontal shear forces,
   said bearing further including energy absorbing components between the adjacent plates so that the components are deformed by shear movement between the plates, the components absorbing energy being steel, lead or a polymeric material of moderate viscosity trapped between rubber rings bonded to the plates;
   each plate or assembly of the plurality of adjacent plates having a skirt which protects against ingress of deleterious matter to spaces between adjacent plates; and
   each plate being formed in two parts and being integral with or attached to adjacent plates above or below, and being constructed from a synthetic or natural rubber material having a shore hardness in the range of above 30 to 80.

2. A high stability structural bearing for placement between members of a structure, the bearing comprising:
   a plurality of adjacent metal stiffening plates constructed from a planar, stiff and rigid material, each plate having a plurality of discrete, spaced-apart resilient disc shaped bearings on a surface thereof abutting a surface of an adjacent plate, the stiffening plates and the disc shaped bearings providing a layered bearing assembly in which the disc shaped bearings of adjacent plates provide generally columnar resilient bearings stiffened by the metal plates to form a stable bearing unit for protecting members of the structure against horizontal shear forces,
   said bearing further including energy absorbing components between the adjacent plates which provide damping therewithin;
   each plate or assembly of the plurality of adjacent plates having a skirt which protects against ingress of deleterious matter to spaces between adjacent plates; and
   each plate being formed in two parts and being integral with or attached to adjacent plates above or below, and being constructed from a synthetic or natural rubber material having a shore hardness in the range of about 30 to 80.

3. A bearing as claimed in claim 2 wherein the energy absorbing components are between adjacent plates of the bearing and/or attached to them so that, the components absorbing energy are deformed by shear movement between the plates.

4. A bearing according to claim 2 in which the disc shaped bearings of adjacent plates are vertically aligned.

* * * * *